(12) United States Patent
Bartlett et al.

(10) Patent No.: US 10,901,791 B2
(45) Date of Patent: *Jan. 26, 2021

(54) PROVIDING CONFIGURABLE WORKFLOW CAPABILITIES

(71) Applicant: Amazon Technologies, Inc., Seattle, WA (US)

(72) Inventors: James P. Bartlett, Seattle, WA (US); Richard J. Cole, Seattle, WA (US); Adam D. Gray, Seattle, WA (US); Peter Sirota, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,608

(22) Filed: Apr. 30, 2019

(65) Prior Publication Data
US 2019/0258524 A1    Aug. 22, 2019

Related U.S. Application Data

(63) Continuation of application No. 14/918,418, filed on Oct. 20, 2015, now Pat. No. 10,324,761, which is a
(Continued)

(51) Int. Cl.
*G06F 9/50* (2006.01)
*G06Q 10/10* (2012.01)
(Continued)

(52) U.S. Cl.
CPC ....... *G06F 9/5027* (2013.01); *G06Q 10/0633* (2013.01); *G06Q 10/103* (2013.01); *H04L 41/0803* (2013.01)

(58) Field of Classification Search
CPC .............. G06Q 10/103; G06Q 10/0633; H04L 41/0803; G06F 9/5027
See application file for complete search history.

(56) References Cited

U.S. PATENT DOCUMENTS 8,099,480 B1 * 1/2012 Muthusrinivasan ... G06Q 10/06 709/222
8,250,520 B2 * 8/2012 Hao ....................... G06Q 10/06 717/102

(Continued)

FOREIGN PATENT DOCUMENTS

| JP | 2010-55610 A | 3/2010 |
| JP | 2010-92260 A | 4/2010 |
| WO | 2009/096519 A1 | 8/2009 |

OTHER PUBLICATIONS

"Data Transformation Services," retrieved on Feb. 14, 2012, from http://en.wikipedia.org/wiki/Data_Transformation_Services, 5 pages.

(Continued)

*Primary Examiner* — Abdullahi E Salad
(74) *Attorney, Agent, or Firm* — Robert C. Kowert; Kowert, Hood, Munyon, Rankin & Goetzel, P.C.

(57) ABSTRACT

Techniques are described for providing clients with access to functionality for creating, configuring and executing defined workflows that manipulate source data in defined manners, such as under the control of a configurable workflow service that is available to multiple remote clients over one or more public networks. A defined workflow for a client may, for example, include multiple interconnected workflow components that are specified by the client and that each are configured to perform one or more types of data manipulation operations on a specified type of input data. The configurable workflow service may further execute the defined workflow at one or more times and in one or more manners, such as in some situations by provisioning multiple computing nodes provided by the configurable workflow service to each implement at least one of the workflow components for the defined workflow.

20 Claims, 6 Drawing Sheets

Related U.S. Application Data continuation of application No. 14/481,553, filed on Sep. 9, 2014, now Pat. No. 9,184,988, which is a continuation of application No. 13/396,479, filed on Feb. 14, 2012, now Pat. No. 8,856,291.

(51) Int. Cl.
*H04L 12/24* (2006.01)
*G06Q 10/06* (2012.01)

(56) References Cited

U.S. PATENT DOCUMENTS

| | | | |
|---|---|---|---|
| 2007/0236708 | A1 | 10/2007 | Jahn et al. |
| 2007/0245013 | A1 | 10/2007 | Saraswathy et al. |
| 2010/0192053 | A1* | 7/2010 | Fujiwara ............... G06Q 10/06 715/222 |
| 2010/0242013 | A1 | 9/2010 | Hao et al. |
| 2010/0250497 | A1* | 9/2010 | Redlich ................. F41H 13/00 707/661 |
| 2010/0280962 | A1 | 11/2010 | Chan |
| 2010/0306020 | A1 | 12/2010 | Lo et al. |
| 2011/0246900 | A1 | 10/2011 | Hedges |
| 2012/0254173 | A1* | 10/2012 | Graefe ............. G06F 16/24552 707/737 |
| 2013/0086116 | A1* | 4/2013 | Agarwal ................... G06F 7/00 707/792 |
| 2013/0144678 | A1* | 6/2013 | Ramachandran ...... G06Q 10/06 705/7.26 |

OTHER PUBLICATIONS

"Oozie—Design," retrieved on Feb. 14, 2012, from http://yahoo.github.com/oozie/design.html, 2 pages.
"Oozie—Workflow engine for Hadoop," retrieved on Feb. 14, 2012, from http://yahoo.github.com/oozie/, 2 pages.
"Petri net," retrieved on Feb. 14, 2012, from http://en.wikipedia.org/wiki/Petri_net, 11 pages.
"Quartz Scheduler," retrieved on Feb. 14, 2012, from http://quartz-scheduler.org/, 1 page.
"Quartz Features," retrieved on Feb. 14, 2012, from http://quartz-scheduler.org/overview/features, 2 pages.
"Quartz Overview," retrieved on Feb. 14, 2012, from http://quartz-scheduler.org/overview, 2 pages.
"SQL Server Integration Services," retrieved on Feb. 14, 2012, from http://en.wikipedia.org/wiki/SQL_Server_Integration_Services, 4 pages.
"Workflow," retrieved on Feb. 14, 2012, from http://en.wikipedia.org/wiki/Workflow_management, 9 pages.
Hoffmann et al., *Image and Workflow Library: Advanced Workflow Solutions using IBM FlowMark*, Jan. 1999, 152 pages.
Marshak, "IBM FlowMark 2.2: Expanding the Capabilities of Object-Oriented Workflow," *Workgroup Computing Report* 19(7), Jul. 1996, 18 pages.
Mohan et al., "A State Machine Based Approach for a Process Driven Development of Web-Applications," *Advanced Information Systems Engineering Lecture Notes in Computer Science* 2348:52-66, 2002.

* cited by examiner

PROVIDING CONFIGURABLE WORKFLOW CAPABILITIES

BACKGROUND

As the amount of data that is generated and used by software programs has grown, the complexity of managing and analyzing such data has also increased in at least some situations. In addition, as software programs increasingly execute in online and other networked environments, the data to manage and analyze is increasingly accessible in disparate locations and manners, which may increase the complexity of managing and analyzing such data. Thus, various problems exist in managing and analyzing data that is generated and used by software programs.

DETAILED DESCRIPTION

Figure 1:
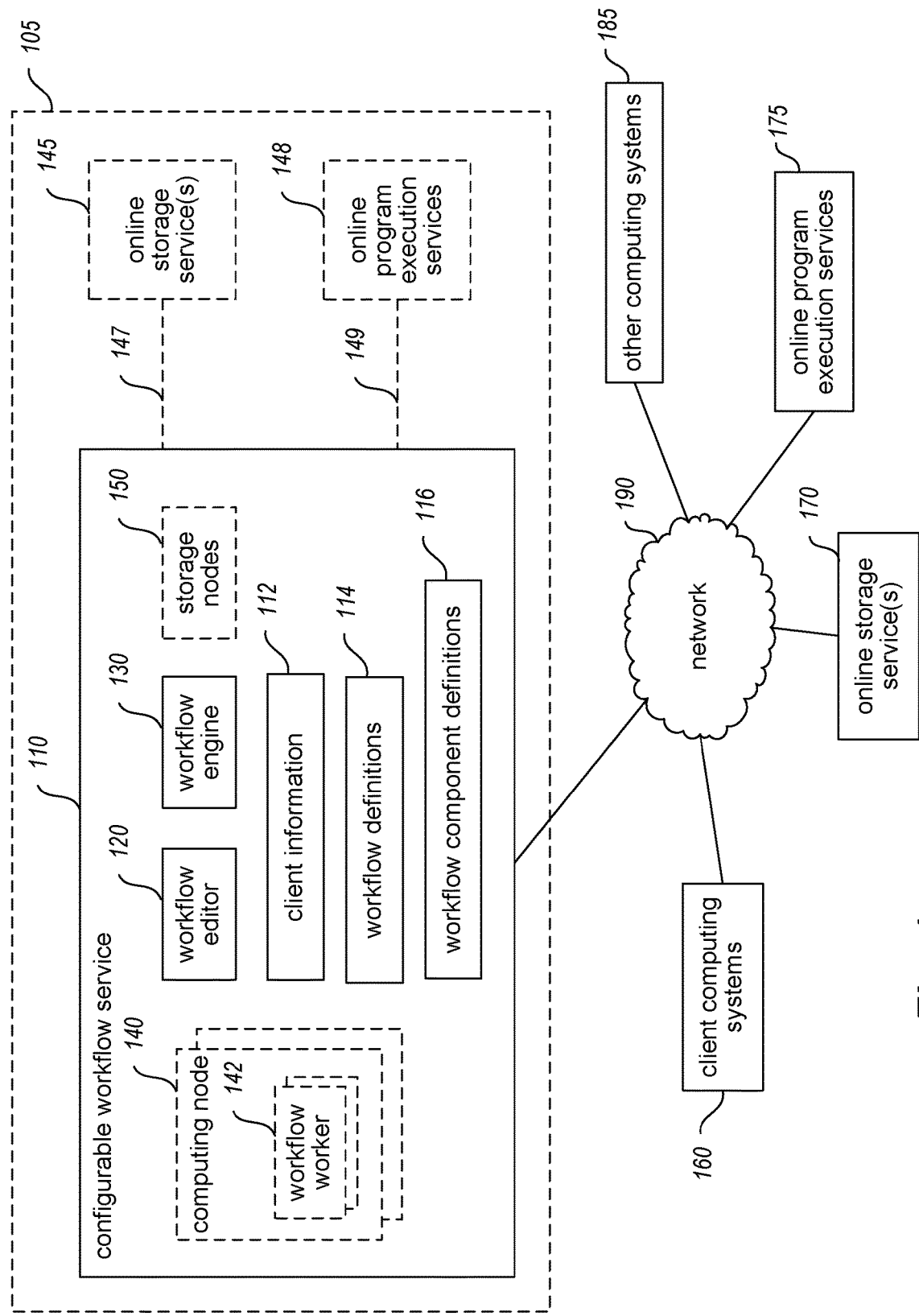
FIG. 1 illustrates an example embodiment of a configurable workflow service that provides functionality to enable remote clients to create, configure and execute defined workflows that manipulate source data in defined manners.

Techniques are described for providing clients with access to functionality for creating, configuring and executing defined workflows that manipulate source data in defined manners, such as under the control of a configurable workflow service that is available to multiple remote clients. In at least some embodiments, a remote client may interact with a configurable workflow service over one or more public networks in order to create and configure a defined workflow that is provided by the configurable workflow service for use by the client—such a defined workflow may, for example, include multiple interconnected workflow components that each are configured to perform one or more specified types of data manipulation operations on a specified type of input data. After a client has configured such a defined workflow, the configurable workflow service may further execute the defined workflow at one or more times and in one or more manners, such as in some situations by provisioning multiple computing nodes provided by the configurable workflow service to each implement at least one of the workflow components for the defined workflow, and by retrieving defined types of source data and providing it to workflow components in defined manners. Thus, in at least some embodiments, some or all of the described techniques are automatically performed by embodiments of a configurable workflow service, such as may be implemented by one or more software modules executing on one or more configured computing systems, as described in greater detail below.

As noted above, a defined workflow may include multiple workflow components, which may be of multiple types in at least some embodiments, including to have one or more data source workflow components that correspond to input data for the defined workflow, one or more data manipulation workflow components that correspond to defined data transformations or other manipulations to be performed on data, and one or more data destination workflow components that correspond to providing output data from the defined workflow. In addition, interconnections may be defined between workflow components that correspond to data flows between workflow components, such that data output from a first component may be supplied as input to a second component, with that relationship being represented as a connection from the first component to the second component. In at least some embodiments and situations, the configurable workflow service may provide a group of predefined workflow components that a client may select and use in a defined workflow of the client, optionally after being configured in one or more manners. Furthermore, in at least some embodiments and situations, the configurable workflow service may enable a client to supply or otherwise define some or all workflow components to be used in a defined workflow of the client.

Each data source workflow component that is defined for a workflow may correspond to obtaining data from an indicated data source, and may include information such as a storage location for the data, and optionally additional access information related to the storage location (e.g., login information associated with the client; a particular search or other information to use to identify data to be used, such as related to metadata and/or data contents; etc.). In some embodiments, the configurable workflow service may provide internal storage locations for use by clients in storing their source data, with a particular data source corresponding to such an internal storage location, while in other embodiments and situations, a particular data source may be external to the configurable workflow service, such as one or more network-accessible storage systems that are provided by or otherwise controlled by the client, one or more online storage services, one or more online data generation services, etc. A non-exclusive list of examples of online storage services that may be used include the following: Amazon Simple Storage Service (S3) that stores object data of various types; Amazon Relational Database Service (RDS) that provides relational database functionality; Amazon SimpleDB that provides functionality to store key-value pairs; Amazon DynamoDB service that provides NoSQL database functionality; Amazon Elastic Block Store (EBS) that provides access to raw block storage devices, including to enable mounting a virtual local block storage device on a target computer system; etc. A non-exclusive list of examples of online data generation services includes an RSS feed, the Amazon Cloudwatch Service that provides monitoring functionality for executing applications and services and generates corresponding information, etc. Data sources may thus be of various forms, such as a relational or other database (e.g., the HBase open-source distributed database, the BigTable distributed database, the MongoDB database system, the Apache Cassandra distributed database management system, etc.), a hash table, a file system, an object store, etc., optionally implemented in a distributed manner, and a non-exclusive list of examples of data groups that may be obtained from a data source includes a file (e.g., a Web server log), a database row or other record, a stored data object, a streamed group of data, etc.

Thus, in some situations and embodiments, a particular defined workflow may obtain and use data from multiple data sources, with some or all of the data sources optionally being external to the configurable workflow service. In addition, the configurable workflow service may optionally predefine one or more types of data source workflow components, such as to correspond to a particular internal storage mechanism of the configurable workflow service, to correspond to one or more particular online storage services (e.g., online storage services that are integrated with or otherwise affiliated with the configurable workflow service, or that instead are unaffiliated with the configurable workflow service), etc. Similarly, a client may optionally define one or more data source workflow components, such as to correspond to a client-specific storage location, to an online storage service without a predefined data source workflow component, etc.

Each data manipulation workflow component that is defined for a workflow may correspond to performing one or more defined data transformations or other manipulations on data that is input to the data manipulation workflow component. In addition, the output from a data manipulation workflow component may be provided to a data destination workflow component to be provided to a client, or instead may be intermediate data that is provided to a next data manipulation workflow component, such as via one or more electronic messages, by storing the intermediate data in a storage location accessible to the next data manipulation workflow component (e.g., using one or more storage locations provided by the configurable workflow service), etc. Defined data manipulations may be of various forms, including to perform a defined type of calculation on one or more groups of input data, to aggregate multiple groups of input data in one or more manners, to select a subset of one or more groups of input data, to move data from one storage location to another, etc. A non-exclusive list of example data manipulations includes performing a distributed data copy, performing one or more SQL (Structured Query Language) transforms, performing one or more map and/or reduce functions within a map-reduce architecture (e.g., for use within the Amazon Elastic MapReduce service), using a scientific or mathematics package (e.g., MatLab, Mathematica, etc.), executing a client-supplied script or other program, etc. Thus, in some situations and embodiments, a particular defined workflow may perform multiple data manipulation operations via multiple defined data manipulation workflow components, using predefined and/or client-defined data manipulation workflow components.

Each data destination workflow component that is defined for a workflow may correspond to providing output data from the defined workflow to one or more storage locations and/or in one or more manners. The types of storage locations used by data destination workflow components (and corresponding information stored for such data destination workflow components) may be similar to or the same as for data source workflow components in at least some embodiments, including to use storage locations that are internal to and/or external from the configurable workflow service. In addition, in at least some embodiments and situations, particular data destination workflow components may include preparing and providing output data in particular manners, such as to generate particular types of reports, to send output data via one or more types of defined electronic communications, etc. Thus, in some situations and embodiments, a particular defined workflow may provide multiple types of output data in multiple manners via multiple defined data destination workflow components, using predefined and/or client-defined data destination workflow components.

Figure 2A:
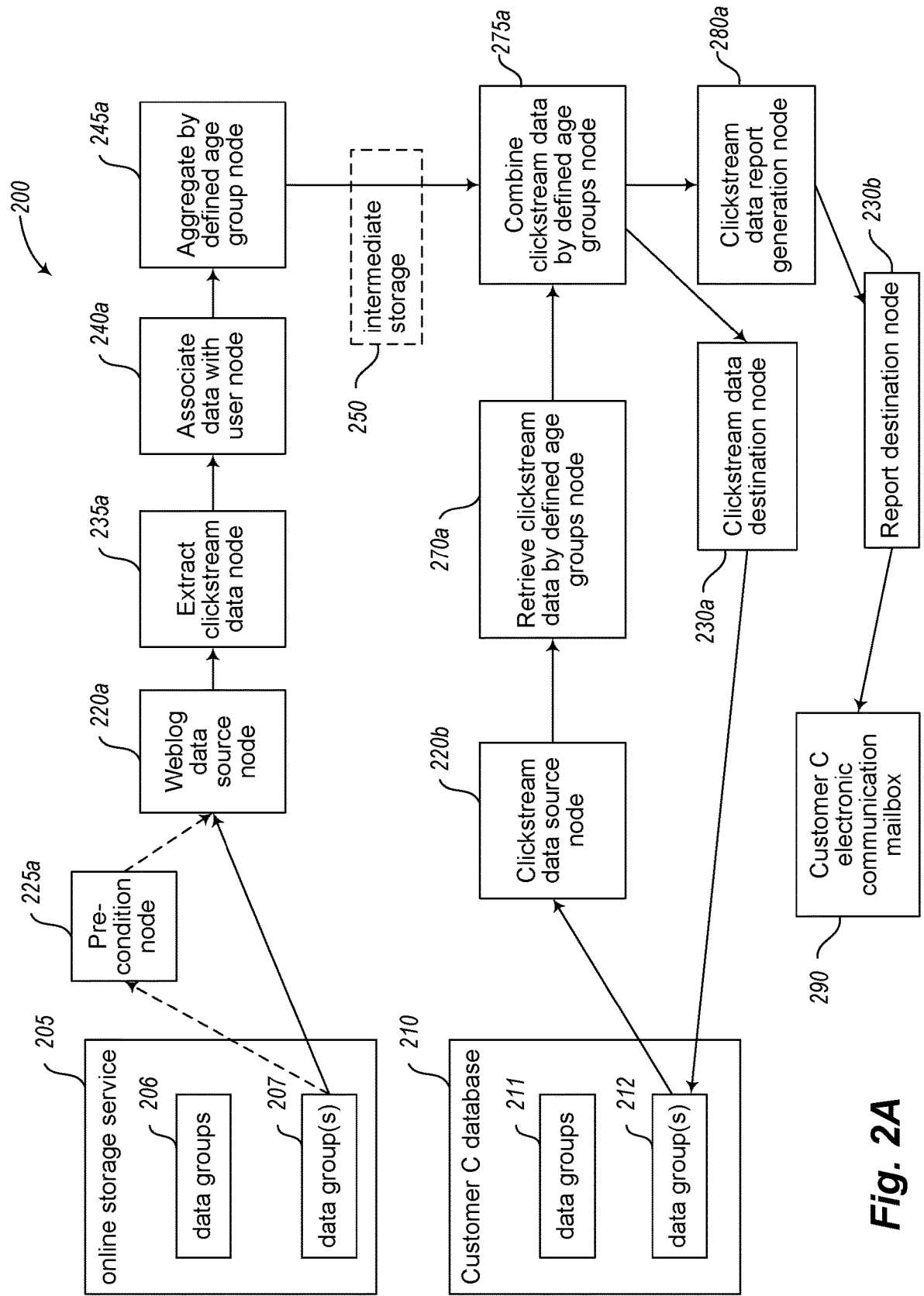
FIGS. 2A-2B illustrate examples of using a defined workflow to manipulate source data in particular manners in particular situations.

In addition, a client may define a workflow in various manners in various embodiments. For example, an embodiment of a configurable workflow service may provide one or more interfaces for use by a client, such as a defined GUI ("graphical user interface"), a defined API ("application programming interface"), and/or a defined CLI ("command line interface"). When using a provided GUI, a user representative of a client may, for example, use a visual editor to specify particular workflow components for a workflow being defined, and may further specify interconnections between particular workflow components corresponding to data flows—in at least some such embodiments, the configurable workflow service may represent the defined workflow as a graph that logically represents the workflow, with various graph nodes corresponding to particular workflow components. FIG. 2A provides additional illustrative details with respect to an example of such a workflow graph.

The configurable workflow service may further implement a defined workflow for a client in various manners and at various times. In some embodiments, each time that a defined workflow is to be used, the configurable workflow service instantiates a physical copy of the logical graph representing the defined workflow, such as by using multiple computing nodes that each implement at least one workflow component for the defined workflow. In particular, in at least some embodiments, some or all of the computing nodes are provisioned by the configurable workflow service to configure those computing nodes to implement particular workflow components (e.g., to load corresponding software and/or data on those computing nodes), such as to each execute a workload worker process corresponding to each such implemented workflow component. The computing nodes may have various forms in at least some embodiments, including to each be a separate physical computer system, a separate virtual machine (e.g., one of multiple virtual machines hosted on a physical computer system), a group of multiple physical computer systems that are operating in a distributed manner, etc. Some or all such computing nodes used for a defined workflow may in some embodiments be selected from a plurality of computing nodes provided by the configurable workflow service for use by clients. In addition, some or all such computing nodes may be provided by or otherwise controlled by the client and/or may be provided by one or more online execution services, whether instead of or in addition to computing nodes provided by the configurable workflow service. A non-exclusive list of example online execution services that may be used include the Amazon Elastic Compute Cloud ("EC2") program execution service, the Amazon Elastic MapReduce service for performing distributed map-reduce operations (e.g., by using a cluster of computing systems from the service to represent or implement a computing node for the configurable workflow service), etc. In addition, when a particular defined workflow is to be implemented multiple times, the configurable workflow service may in some embodiments maintain the provisioning and availability of some or all computing nodes for the defined workflow between two or more such times of implementing the defined workflow (e.g., in accordance with instructions from the client, based on an automated determination by the configurable workflow service, etc.), while in other embodiments may release some or all such computing nodes to be available after an implementation and provide the same types of provisioning of computing nodes (optionally different computing nodes) for a next implementation.

A defined workflow may further have additional types of associated information in at least some embodiments and situations. For example, a client may specify information that indicates when to implement a defined workflow, such as based on a client instruction for immediate implementation, by scheduling future implementation at one or more defined future times, by scheduling one or more future implementations when one or more defined criteria are satisfied (e.g., based at least in part on availability of particular source data), etc. Defined criteria may be specified in various manners, such as to be associated with particular workflow components or instead with the defined workflow as a whole. For example, a particular workflow component may have defined precondition criteria to evaluate to determine when to execute the workflow component, and/or may have defined post condition criteria to evaluate when to complete execution and/or provide data that is produced (e.g., to a next workflow component, to an intermediate storage location, etc.). In some embodiments and situations, a defined workflow may further have one or more associated alarms that may be used to provide notification to a client (or to perform other activities) when one or more specified criteria are satisfied or are not satisfied (e.g., if a defined workflow is not implemented at a particular time, such as if particular source data is not available).

The configurable workflow service may further be a fee-based service in at least some embodiments, such that clients of the configurable workflow service are customers that pay fees to the configurable workflow service for at least some of the functionality provided by the configurable workflow service. In addition, when one or more online storage services and/or online execution services are used by the configurable workflow service as part of implementing a particular defined workflow for a particular client, such other services may also optionally charge fees for such use, whether via the configurable workflow service or directly to the client.

Thus, use of the configurable workflow service may provide various benefits in various embodiments and situations, including to enable a client to schedule gathering data from multiple sources at particular times or otherwise when particular criteria are satisfied, to perform defined types of data manipulation operations on the source data, and to provide output data produced by the defined workflow in various manners. Additional benefits are discussed elsewhere herein, and will otherwise be appreciated by those skilled in the art.

For illustrative purposes, some embodiments are described below in which specific instances of defining and implement workflows are provided in specific ways, including with respect to specific types of data, specific types of data manipulation operations, and specific types of storage services and execution services. These examples are provided for illustrative purposes and are simplified for the sake of brevity, and the inventive techniques can be used in a wide variety of other situations, some of which are discussed below, and the techniques are not limited to use with particular types of data, storage or other devices, computing systems or computing system arrangements.

FIG. 1 is a network diagram that illustrates an example embodiment of a configurable workflow service 110 that manages creation and execution of defined workflows for various clients of the configurable workflow service. As part of implementing a defined workflow, the configurable workflow service 110 further provisions particular computing nodes to each perform specified activities corresponding to the defined workflow. In some embodiments, the configurable workflow service 110 optionally provides a group of computing nodes 140 on which defined workflows for clients may be executed. In other embodiments, some or all of the computing nodes used by the configurable workflow service may be provided externally to the configurable workflow service, such as by a client on whose behalf the defined workflow is implemented, by one or more online execution services, etc. In addition, in some embodiments, the configurable workflow service 110 optionally includes one or more storage nodes 150 on which data may be stored to facilitate the execution of defined workflows. For example, the storage nodes 150, if present, may be used to store intermediate data results that are produced during execution of a defined workflow, and in some embodiments may further be used to store source data that is provided to a defined workflow and/or final output data produced by a defined workflow. While not illustrated in FIG. 1, the configurable workflow service may be implemented using one or more configured computing systems, as described in greater detail with respect to FIG. 3 and elsewhere.

FIG. 1 further illustrates one or more networks 190, and various client computing systems 160 via which clients of the configurable workflow service 110 may interact with the service 110 to define and execute workflows. The network(s) 190 of FIG. 1 may include any appropriate network or combination of networks, including an intranet, the Internet, one or more private networks with access to and/or from the Internet, a cellular network, a local area network, or any other such network or combination thereof. Communications over the networks may be enabled by wired or wireless connections and combinations thereof.

In some embodiments, the configurable workflow service 110 may provide one or both of a GUI (not shown) and/or an API (not shown), such as to enable clients to perform various interactions with the service 110. For example, a user representative (not shown) of a particular client may locally interact with one of the client computing systems 160 to cause further interactions to occur with the configurable workflow service 110 over the network 190. The user may, for example, interact with a workflow editor module 120 of the configurable workflow service, via which the user may define one or more workflows of interest for the client. As part of the interactions with the user, the configurable workflow service 110 may store various client information 112 regarding the client and optionally the user representative, and may store a particular definition of a newly defined workflow for the client as part of information 114. In some embodiments, the defining of a particular workflow may include actions by the user in selecting one or more defined workflow components and specifying the interactions between those workflow components, such as by using one or more predefined system-provided workflow component definitions 116—in other embodiments, the configurable workflow service 110 may not provide any such system-provided predefined workflow components. As part of defining a new workflow, the user may further specify one or more source locations at which source data is to be retrieved and used for the workflow definition, and one or more destination locations to which data that is produced by the defined workflow will be provided. The various information 112, 114, and 116 used by the configurable workflow service 110 may further be stored on one or more systems that support or provide the configurable workflow service 110, such as a database of the configurable workflow service, although such systems are not illustrated with respect to FIG. 1.

In addition, the user representative of the client may optionally in some embodiments define one or more new workflow components as part of defining a new workflow, and if so, such client-defined workflow components may further have definition information stored in information 116 in at least some embodiments. While a client-defined workflow and any client-defined workflow components may in some embodiments be treated as private unless otherwise specified by the client (e.g., to be accessible or otherwise visible only to that client unless other specified), in other embodiments and situations, at least some such client-specific information may instead be made available to other clients in specified circumstances, such as to enable other clients to use some or all of the client's defined workflow components and/or workflows (e.g., for a fee or for other benefits provided to the client who defined such information, if the client who defined such information approves use by others, etc.). In a similar manner, source data used by a client's defined workflow and final output data produced by a client's defined workflow may in at least some embodiments be treated as private to that client unless otherwise specified, although in other embodiments some or all such source data and/or final output data may instead be made available to other clients in specified circumstances (e.g., for a fee or for other benefit to the client with which that data is associated, if the client associated with such information approves use by others, etc.).

When a client indicates one or more storage locations from which source data may be obtained and/or to which final output data may be provided for a defined workflow, such storage locations may have various forms in various embodiments, as discussed in greater detail elsewhere. As one example, in at least some embodiments, the configurable workflow service may be integrated with or otherwise affiliated with one or more particular optional online storage services 145, such as to form a single system 105 (e.g., a single system that is operated by a single entity). If so, interactions 147 with such optional online storage services 145 may be performed to retrieve source data and/or to store final output data. Furthermore, in at least some embodiment, intermediate data results that are generated during execution of a workflow may similarly be stored in such online storage services 145, such as to be produced by a first part of the defined workflow and to be later accessed and used by a second defined part of the workflow, whether in addition to or instead of one or more optional storage nodes 150. Moreover, in at least some embodiments and situations, one or more online storage services 170 are available over the network 190 to the client computing system 160 and to the configurable workflow service 110, and may be used in a similar manner over the network(s) 190, whether in addition to or instead of some or all of the optional online storage services 145. In addition, in at least some embodiments and situations, a particular client may provide one or more client-specific storage systems or other storage locations using one or more other computing systems 185, which may similarly be used over the network(s) 190.

After a client has interacted with the configurable workflow service to define a workflow, the client may further interact with a workflow engine module 130 of the configurable workflow service to initiate execution of the defined workflow. The execution of a particular workflow may be initiated in various manners, such as to be performed immediately upon a corresponding instruction from the client, to occur at a specified future time or when other specified criteria (such as for one or more defined preconditions) are satisfied that will initiate execution of the workflow, etc. As with the workflow editor module 120, the workflow engine module 130 may in some embodiments provide a GUI interface and/or API interface for use by clients. When the execution of a defined workflow is initiated, the workflow engine module 130 in the example embodiment retrieves workflow definition information for that defined workflow from the information 114, and initiates the execution of the defined workflow on one or more computing nodes. In particular, the workflow definition may be constructed with various logical nodes that each correspond to defined operations and are interconnected in various manners, and the workflow engine module 130 may select particular computing nodes to use to perform particular such operations, as well as to further perform activities to provision and initiate execution of corresponding workflow worker processes on each such selected computing node. As part of provisioning such computing nodes and/or of executing workflow worker processes on the computing nodes, additional interactions with one or more storage locations may be performed to obtain input data to be used and/or to store results data that are produced, including for intermediate results data for use by other workflow worker processes of the defined workflow.

Some or all of the computing nodes used to implement a defined workflow may, for example, be selected from optional computing nodes 140 provided by the configurable workflow service 110, if present, and workflow worker processes 142 may be executed on those computing nodes to implement the defined operations. In other embodiments, the workflow engine module 130 may use computing nodes that are not provided by the configurable workflow surface 110, whether instead of or in addition to the optional computing nodes 140. For example, in some embodiments and situations, a particular client may provide or otherwise control one or more other computing systems 185, and the workflow engine 130 may configure and use such other computing systems 185 as computing nodes for use in executing that client's defined workflow. In addition, in some embodiments, one or more online program execution services 148 and/or 175 may be available for use in executing programs in various manners, and if so may be used to provide computing nodes (not shown) to execute some or all of a particular client's defined workflow—for example, the workflow engine module 130 may provision and initiate execution of particular workflow worker processes on particular computing nodes provided by such online program execution services. As one example, in at least some embodiments, the configurable workflow service may be integrated with or otherwise affiliated with one or more particular optional online program execution services 148 (whether in addition to or instead of one or more optional storage services 145), such as part of a single system 105 as described above. If so, interactions 149 with such optional online program execution services 148 may be performed to provision computing nodes, initiate execution of particular workflow components, receive output data produced by particular workflow components, etc.

In other embodiments, the configurable workflow service 110 may perform additional techniques, such as to generate and provide particular types of source data for defined workflows, to perform additional activities with respect to managing final output data produced by clients' defined workflows, etc. In addition, the configurable workflow service 110 may be implemented in some embodiments based on software instructions that execute on one or more server computing systems to program or otherwise configure the server computing system(s) to perform some or all of the described techniques, such as to program one or more hardware CPU processors (not shown) of the server computing system(s)—such software instructions may, for example, be used to implement the modules 120 and/or 130, or instead the functionality of the configurable workflow service may be provided using other types of modules.

In this manner, the configurable workflow service 110 provides various benefits to various external clients, including to enable the clients to define workflows that may be executed using computing and storage resources of the configurable workflow service 110 in part or in whole, to interact with various types of online data sources to obtain data to be manipulated, and to provide output data that is produced for storage or other use. Additional details related to particular operations of the configurable workflow service 110 are included elsewhere herein.

Although the foregoing example embodiment of FIG. 1 is described with respect to a configurable workflow service 110 that provides various types of functionality in conjunction with one or more client systems that each may have one or more associated users, it will be appreciated that various other embodiments may exist. For example, in at least some embodiments and situations, a client may represent an organization or other group (e.g., a company that has multiple people instead of an individual person). Thus, a client entity may have various forms in various embodiments.

In some embodiments, the configurable workflow service 110 and optionally any online storage services and/or online program execution services that are used may each operate according to one or more fee-based structures or agreements. For example, access to some or all of the described techniques from the configurable workflow service 110 may in some embodiments be provided in a fee-based or other paid manner to a provider or operator of the configurable workflow service 110 and/or to at least some client systems that use described techniques of the configurable workflow service 110. As one example, clients of the configurable workflow service 110 may pay one-time fees, periodic (e.g., monthly) fees, and/or one or more types of usage-based fees to use functionality provided by the configurable workflow service 110. Such fees may be based on one or more factors and activities, such as indicated in the following non-exclusive list: based on a quantity and/or type of interactions performed to define a particular workflow; a size and/or type of a defined workflow and/or of some or all of its defined workflow components; based on usage of a defined workflow, such as a measure of computing resources used in executing a defined workflow (e.g., a quantity of computing nodes used), a measure of processor capability used (e.g., CPU cycles), an amount of time that occurs during the execution of the defined workflow, activities in provisioning computing nodes for a defined workflow, amount of time during which computing nodes that are provisioned for a defined workflow are unavailable for other use, such as while those computing nodes wait for source data to be available or other preconditions to be satisfied, based on a quantity of data that is stored and/or transferred, such as based on a size of the data, an amount of time of the storage, etc.; based on content or other characteristics of particular data groups that are stored, manipulated and/or produced; etc.

Figure 2B:
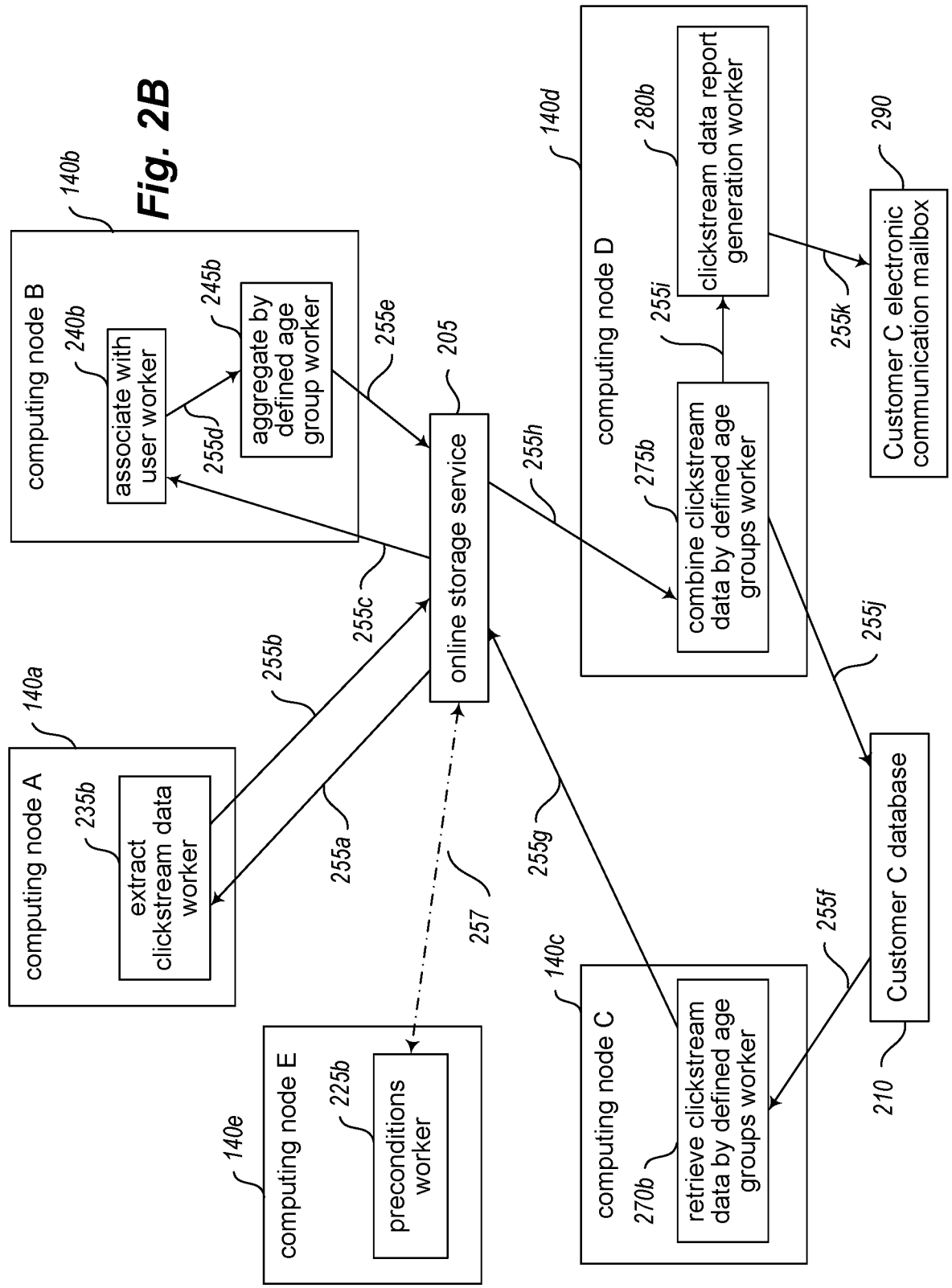

FIGS. 2A-2B illustrate examples of defining and executing a workflow for a client in particular manners in particular situations. In particular, in the examples of FIGS. 2A-2B, a client has access to Weblog data (such as from a Web site operated by the client, or instead in other manners), and desires to analyze that data to determine information of interest. In particular, in this example, the client desires to perform periodic (e.g., every three hours) analysis of the Weblog data in order to identify clickstream data of particular users of the Web site, and to aggregate that clickstream data in one or more manners (e.g., to determine aggregate information for particular defined age groups of the users of the Web sites). After the clickstream data is aggregated in the defined manners, it may further be used in various manners, including to be stored in a database of the client for later use, as well as to be used to generate one or more reports that are provided to the client via one or more electronic communications.

In particular, with respect to FIG. 2A, a particular client of the configurable workflow service (referred to in this example as "Customer C") has defined a new workflow that includes various nodes and interconnections, such as based on various interactions with a workflow editor module of the configurable workflow service, or instead by performing one or more programmatic interactions with a defined API of the configurable workflow service to provide information about the defined workflow in a defined manner (e.g., by uploading a file or otherwise specifying one or more data structures to represent the defined workflow). In this example, the defined workflow is represented with a logical graph 200 that includes various nodes.

In FIG. 2A, the Customer C has defined two data source nodes 220 to represent two types of sources of data for the defined workflow. The first data source 220a corresponds to the Weblog data that becomes available periodically, which in this example is stored by an online storage service 205. In particular, in this example the online storage service 205 stores various data groups 206 and 207 (e.g., files), and the node 220a that corresponds to the Weblog data source includes information to use to select one or more particular data groups 207 from the online storage service that represent the Weblog data for the client. The node 220a may include various criteria to use to identify particular data groups 207, such as a file name or other metadata associated with a particular data group, one or more specified criteria with respect to content of the data groups 207 (e.g., a time frame corresponding to Weblog data to be used to extract records from a database that correspond to a time period of interest), etc. The node 220a may further include various access information to be used to obtain the data groups 207 from the online storage service 205, such as account information or other access information for Customer C at the online storage service with which the data groups 207 are associated. In addition, in this example the Customer C has defined one or more preconditions as part of node 225a that are associated with the data source node 220a, such as to indicate that the execution of node 220a and then the rest of the workflow is to begin when the data groups 207 that satisfy the specified criteria for the node 220a are available. In other embodiments, the preconditions 225a or other configuration information for the execution of the defined workflow may have other forms, such as to indicate that the workflow is to be executed at a particular time, or after a particular amount of time has passed since the last execution of the defined workflow. Thus, the preconditions 225a may, for example, be implemented in a worker process that interacts with the online storage service 205 to determine when the data groups 207 are available, and then initiates execution of a worker process corresponding to node 220a—in at least some embodiments, the configurable workflow service may wait to implement some or all nodes of the workflow 200 other than a precondition node 225a until those preconditions are satisfied, such as to provision a computing node to execute the worker process corresponding to node 220a after the preconditions have been satisfied.

In addition to the Weblog data source node 220a, the Customer C has also defined a data source node 220b that corresponds to a database of the client, such as may be stored on one or more storage systems (not shown) under control of the client or instead that are available via an online database storage service (not shown). In this example, the database 210 of the Customer C includes various data groups 211 and 212 (e.g., database records), with the data groups 212 storing clickstream data that has been previously generated for the Web site of the client, whether by previous executions of this or a similar workflow, or instead in other manners. In this example, the node 220b does not include any defined preconditions, such as based on the database data being known to be present, or instead based on the database data being optional for the execution of the defined workflow (e.g., so that the current Weblog data will be added to and aggregated with any previously stored clickstream data, but will generate new clickstream data to be stored even if such existing clickstream data does not exist).

In addition to the data source nodes 220, the Customer C has further defined various data manipulation nodes 235a-280a that are part of the defined workflow. The defined nodes 235a-280a of the workflow each specify one or more data manipulation operations to be performed on specified source data, and to perform particular activities with the results of those defined data manipulation operations. In particular, in this example the Customer C has defined a first node 235a that is interconnected with the data source node 220a, with the node 235a being configured to perform data manipulation operations that involve extracting clickstream data for various users from the Weblog data that is provided by the data source node 220a. As discussed in greater detail elsewhere, the data manipulation operations may be specified in various manners, including with particular program code to be executed, database operations to be performed (e.g., specified in SQL or in another defined database manipulation format), via use of defined mathematical or scientific libraries or functions, etc. Furthermore, particular data manipulation operations may be specified in other manners in other embodiments, such as to combine some or all of the defined nodes 235a-280a in a fewer number of nodes (e.g., one), and/or to separate the data transformation operations of node 235a into multiple distinct nodes.

In this example, after the data manipulation node 235a performs its data manipulation operations, the intermediate results of those data manipulation operations are configured to be provided to a next data manipulation node 240a, which in this example is configured to associate each group of clickstream data that is extracted by node 235a with a particular user. For example, the clickstream data provided by node 235a may be grouped and associated with a unique identifier for each user, but may lack further identifying information about the corresponding users. The data manipulation operations of node 240a may include identifying particular users, and determining corresponding information for those users. For example, an age of each user may be obtained and used in node 240a to be associated with the user's corresponding clickstream data that was extracted in block 235a. Accordingly, the intermediate results output data from block 240a includes a group of clickstream data corresponding to particular users that are identified by age, and are configured in this example embodiment to be provided a next data manipulation node 245a that is defined for the workflow. While not illustrated in this example, the data manipulation node 240a may further in some embodiments obtain user-related data from another data source node (not shown) to enable its operations, such as from one of the illustrated source locations 205 or 210, or instead from a different source location (not shown).

The data manipulation node 245a is defined in this example embodiment to aggregate the various clickstream data and associated users from node 240a by defined groups of ages, such as to aggregate clickstream data for users in age groups 18-25, 26-50, 51-65, and 66+. Thus, the intermediate results from the data manipulation operations of node 245a may include summary information for one or more clickstream measures for each defined age group, such as number of pages viewed, amount of time spent per page or per site, particular types of activities performed, etc. These intermediate data results produced by the node 245a are configured in the illustrated example to be provided to a data manipulation node 275a that combines this new clickstream data with other preexisting clickstream data if available.

In addition, while the nodes of the defined workflow are illustrated in the example of FIG. 2A in a logical manner that shows interconnections between the nodes in an abstract manner, in some embodiments, the defined workflow may further include additional details about how the implementation of the defined workflow is to occur during execution. For example, some or all of the nodes of the defined workflow may include details about particular storage locations from which to obtain the data that the node is to use, and/or particular storage locations in which the results of the node are to be stored. Thus, with respect to data manipulation node 245a, the node may further be defined to optionally store the intermediate data results that it produces in a particular specified storage location, which is illustrated in FIG. 2A as optional intermediate storage 250. Such intermediate storage 250 may, for example, correspond to one or more of optional storage nodes 150 of FIG. 1, optional online storage services 145 of FIG. 1, online storage services 170 of FIG. 1, etc. As one specific example, the intermediate storage 250 may be the online storage service 205, and the node 245a may be configured to store its results as one or more particular data groups 208 (not shown) on the online storage service, such as by specifying a particular data group name or other storage location of the online storage service in which the intermediate results from node 245a will be stored. In a similar manner, if such an intermediate storage location is specified for node 245a, the next node 275a in the node graph may include a defined input storage location that is that same storage location from which to obtain those intermediate data results produced by the node 245a. Additional details of the user of such intermediate storage locations are described in further detail with respect to the example of FIG. 2B. In other embodiments, the configurable workflow service may manage the transfer of data between workflow components, whether by using one or more intermediate storage locations that are automatically selected by the configurable workflow service, by performing message passing, etc.

In addition, as previously noted, the Customer C has in this example previously generated data groups 212 on the database 210 that correspond to previously existing clickstream data for the client. Such clickstream data may, for example, include some or all of the types of clickstream data that is aggregated with respect to node 245a, and may further include various other types of clickstream data that does not correspond to node 245a, such as with respect to other data groups 211 of the database 210. In addition, the data source node 220b was previously defined to extract those data groups 212 that correspond to the clickstream data of interest for this defined workflow. Accordingly, the Customer C further defines a data manipulation node 270a that is configured to receive those data groups 212 from the clickstream data source node 220b, and to retrieve particular clickstream data of interest corresponding to the defined age groups and types of clickstream data of node 245a. The data manipulation operations of node 270a may include, for example, extracting particular data records from the database 210, or may include additional types of operations (e.g., performing one or more database join operations to combine data from multiple database tables of the database, performing one or more database select operations to select a subset of data from a database table, etc.). Thus, the intermediate data results provided by the data manipulation of node 270a include the same types of clickstream data and the same types of defined age groups as were previously noted with respect to node 245a. In other embodiments, one or more of the nodes 235a-245a may instead manipulate the new clickstream data to match the database record structure of the data groups 212.

Thus, the data manipulation node 275a is configured to receive intermediate data results that are produced by node 245a, and is further configured to receive intermediate data results produced by node 270a. When both types of data are available, the node 275a is configured to combine the clickstream data of the defined types by the defined age groups. The intermediate data results produced by the node 275a are then configured to be used in two distinct manners in this example. In particular, the Customer C has further defined two data destination nodes 230 that correspond to two defined destinations to which the data produced by the defined workflow will be provided. In particular, a first data destination node 230a is defined to correspond to the database 210 of the Customer C, and in particular to correspond to the same set of data groups 212 as does the data source node 220b. Thus, when the intermediate data results of node 275a are produced and made available to the data destination node 230a, those data results are configured to be sent to the database 210 as final output of the defined workflow, and to be stored as part of the data groups 212, such as by adding additional data records to the database to supplement the previously existing data that was retrieved by node 220b, or to instead replace some or all of the previously retrieved data with new updated data that further includes the information from the most recent set of Weblog data.

In addition to storing the updated clickstream data in the database 210, the Customer C further defines a data destination node 230b that corresponds to communicating a generated report to the Customer C via one or more electronic communications sent to a mailbox 290 of the Customer C. Thus, the defined workflow 200 further includes a data manipulation node 280a that is defined to take the intermediate results from the node 275a and to perform data manipulation operations that include generating a report in a defined manner that includes some or all of the clickstream data from node 275a (e.g., optionally just the new clickstream data output by node 245a). The intermediate data results generated by the node 280a, which in this example are configured to include one or more defined reports that present information in a structured manner, are provided to the data destination node 230b, which is configured to provide that final output of the defined workflow 200 to the mailbox 290 of the Customer C via one or more electronic communications.

Thus, in the illustrated example of FIG. 2A, the Customer C client of the configurable workflow service has defined a workflow 200 that, when implemented, combines data of different types from different sources to produce multiple types of output data of interest to the client, which is automatically made available to the client in multiple specified manners.

FIG. 2B continues the example of FIG. 2A, and in particular provides additional details related to an example implementation of the defined workflow 200 of FIG. 2A. In particular, FIG. 2B illustrates various computing nodes 140 that have been configured to perform various workflow worker processes 225b-280b that correspond to the logical nodes 225a-238a of the defined workflow graph 200.

As discussed in greater detail elsewhere, the computing nodes 140 may come from one or more sources, including by using one or more computing nodes provided by the configurable workflow service, by using one or more computing nodes made available by the Customer C client, and/or by using one or more computing nodes provided by each of one or more external online execution services. When accessing computing nodes made available by the Customer C client, the configurable workflow service may optionally use access information supplied by the Customer C client to enable interactions with those computing nodes (e.g., to provision the computing nodes, to execute software on the computing nodes, etc.). When accessing computing nodes from an external online execution service for use on behalf of the client, the configurable workflow service may in some embodiments and situations use information for the client as part of interactions with the online execution service, such as information for an existing account of the client with the online execution service—if so, the computing nodes from the online execution service that are being used by the configurable workflow service may in at least some such situations also be accessible to the client via interactions between the client and the configurable workflow service. Alternatively, when accessing computing nodes from an external online execution service for use on behalf of the client, the configurable workflow service may in some embodiments and situations use an account of the configurable workflow service with the online execution service, such that the online execution service considers those computing nodes to be associated with the configurable workflow service rather than the client—if so, those computing nodes from the online execution service that are being used by the configurable workflow service on behalf of the client may in at least some such situations not be accessible (or possibly even visible) to the client, including based on any interactions between the client and the configurable workflow service.

FIG. 2B includes the online storage service 205 of FIG. 2A, although it does not illustrate details about the particular data groups 206 and 207 that are stored by the online storage service 205. In this example, the configurable workflow service has selected and provisioned a first computing node E 140e to perform a workflow worker process 225b that corresponds to the preconditions node 225a of the defined workflow 200, such as by determining whether the defined preconditions are satisfied (e.g., by performing one or more interactions 257 to determine whether particular source data from the online storage service 205 that corresponds to the data groups 207 of FIG. 2A are available). When the preconditions are satisfied, the workflow worker process 225b initiates the performance of a next worker process 235b, such as by providing corresponding instructions (not shown) to the configurable workflow service. The configurable workflow service has further selected and provisioned a computing node A 140a to perform the workflow worker process 235b in this example, which corresponds to the node 235a of the defined workflow 200. In particular, the worker process 235b of FIG. 2B performs one or more interactions 255a to obtain source data from the online storage service 205 that correspond to the data groups 207 of FIG. 2A, such as by using information defined with respect to the source node 220a of FIG. 2A, and in accordance with the preconditions for the node 225a of the defined workflow 200 being satisfied.

The worker processes 225b and 235b may in some embodiments and situations execute at different times, on different types of computing nodes (e.g., if the computing node E is provided by the configurable workflow service, and the computing node A is provided externally to the configurable workflow service), in different manners (e.g., with worker process 225b executing on a single physical computing system that provides computing node E, and with worker process 235b executing in a distributed manner on multiple physical computing systems that provide computing node A), etc. Thus, while a particular worker process such as worker process 235b is illustrated as a single process in the example of FIG. 2B, it will be appreciated that actual worker processes may be implemented in various manners in various embodiments, including by using one or more physical computing systems to represent the computing node that executes the worker process, whether provided by the configurable workflow service or instead by one or more online program execution services that are external to the configurable workflow service.

In the illustrated example, after the worker process 235b receives the source data via interactions 255a and performs the data manipulation operations described with respect to node 235a of FIG. 2A, the worker process 235b generates intermediate data results that are stored in online storage service 205 via one or more interactions 225b with the online storage service. While the particular intermediate results are not illustrated in the example of FIG. 2B, the results may be stored in various manners, as described with respect to the intermediate storage 250 of FIG. 2A, including in a particular storage location that is configured as part of the node 235a and/or the worker process 235b.

After the intermediate results have been stored via the interactions 225b, a worker process 240b executing on computing node B 140b performs more interactions 255c with the online storage service 205 to obtain those intermediate data results for use, optionally based on the use of one or more preconditions (not shown) that are satisfied when those intermediate data results are available. In particular, in this example the configurable workflow service has selected computing node B to execute worker processes 240b and 245b that correspond to the nodes 240a and 245a of FIG. 2A, respectively. Thus, with respect to the worker process 240b, the process performs one or more data manipulation operations previously described with respect to node 240a of the FIG. 2A. In this example, because the computing node B is executing multiple worker processes, the intermediate data results produced by the worker process 240b are not stored in the online storage service 205, but are instead passed directly via interactions 255d to the worker 245b, such as via in-memory access or instead via one or more other types of electronic communications. In other embodiments, the worker process 240b may instead store such intermediate data results with the online storage service even if the next worker process 245b in the dataflow will later retrieve and use those same intermediate data results.

In this example, the executing worker process 245b next performs the data manipulation operations previously described with respect to node 245a of FIG. 2A, including to use the intermediate data results produced by the worker process 240b and to generate its own intermediate data results, which in this example are stored in the online storage service 205 via one or more interactions 255e. While the online storage service 205 is used to store the intermediate data results of multiple distinct worker processes in this example, in other embodiments the intermediate data results of the various worker processes may be stored in other manners, including to store intermediate data results of different worker processes in different online storage services, or instead in other manners.

In addition to the online storage service 205 of FIG. 2A, FIG. 2B also illustrates the database 210 of the Customer C client, although the example data groups 211 and 212 of FIG. 2A are not illustrated in FIG. 2B. In this example, the configurable workflow service has further selected a computing node C 140c to execute a worker process 270b that corresponds to the node 270a of the workflow 200 of FIG. 2A. Thus, the worker process 270b of FIG. 2B performs one or more data manipulation operations previously described with respect to node 270a, including to perform interactions 255f with the database 210 to obtain the data groups 212 defined with respect to the data source node 220b. In this example, the worker process 270b similarly stores its intermediate data results in the online storage service 205 via one or more interactions 255g, although in other embodiments may store such intermediate results in other manners.

After the intermediate data results are available from the worker processes 245b and 270b, a worker process 275b of computing node D 140d performs one or more interactions 255h with the online storage service 205 to obtain both of those sets of intermediate data results, and to generate corresponding combined data by performing one or more data manipulation operations previously described with respect to node 275a of FIG. 2A. In particular, in this example the configurable workflow service has selected computing node D to execute the worker process 275b, as well as a worker process 280b that corresponds to node 280a of FIG. 2A. Thus, after the worker process 275b produces its results, the process performs one or more interactions 255j to store those results in the database 210, such as in a manner specified with respect to destination node 230a of FIG. 2A. In addition, in this example, the worker process 280b obtains those intermediate data results from worker process 275b via one or more interactions 255i, and generates one or more reports in the manner configured with respect to node 280a of FIG. 1. The worker process 280b further proceeds to perform one or more interactions 255k to send those reports to a mailbox 290 of Customer C, such as in a manner specified with respect to destination node 230b of FIG. 2A.

Thus, in this manner, the logical defined workflow graph 200 of FIG. 2A is implemented via a physical instantiation of that defined workflow using the computing nodes 140 illustrated with respect to FIG. 2B, as well as using intermediate storage to manage the transfer of some or all intermediate data results between workflow worker processes.

It will be appreciated that the examples of FIGS. 2A and 2B are provided for illustrative purposes, and that the invention is not limited by the details discussed with respect to those examples.

Figure 3:
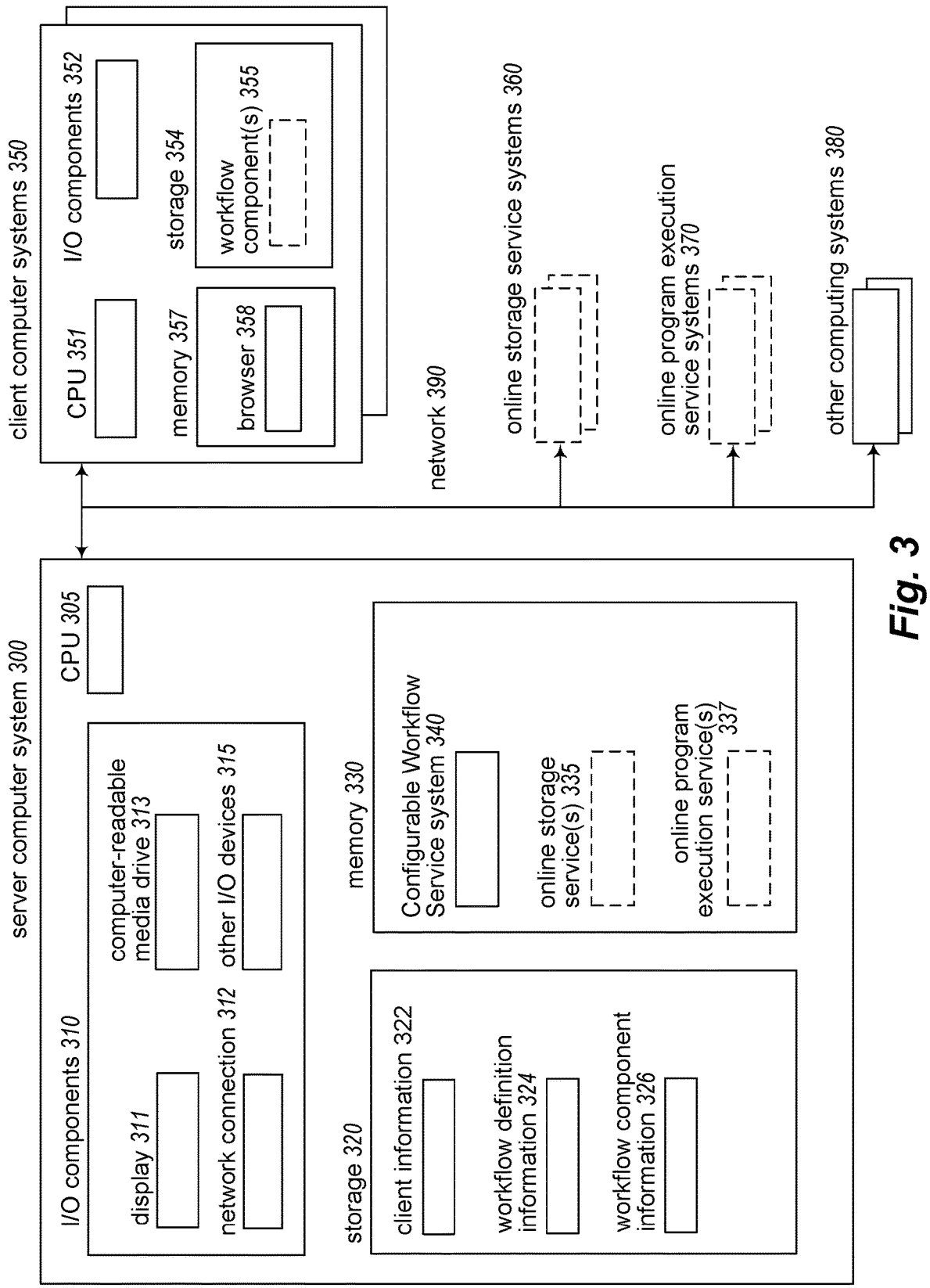
FIG. 3 is a block diagram illustrating an example embodiment of a computing system configured to provide a configurable workflow service that manages use of defined workflows for supported client systems.

FIG. 3 is a block diagram illustrating an example embodiment of a computer system suitable for performing techniques to manage the definition and implementation of workflows for supported client systems. In particular, FIG. 3 illustrates a server computer system 300 suitable for executing an embodiment of a system 340 that provides a configurable workflow service, as well as various client computer systems 350, optional online storage service systems 360, optional online program execution service systems 370, and other computing systems 380. In the illustrated embodiment, the computer system 300 has components that include one or more hardware CPU processors 305, various I/O components 310, storage 320, and memory 330, with the illustrated I/O components including a display 311, a network connection 312, a computer-readable media drive 313, and other I/O devices 315 (e.g., a keyboard, a mouse, speakers, etc.). In other embodiments, the computer system 300 may have more or less components than are illustrated, and the local storage 320 may optionally be provided by one or more non-volatile storage devices that are included within or otherwise locally attached to the computer system 300.

In addition, the illustrated client computer systems 350 have components similar to those of computer system 300, including a CPU 351, I/O components 352 (although particular components are not illustrated), storage 354, and memory 357. The other systems 360, 370, and 380 may also each include similar components to some or all of the components illustrated with respect to computer system 300, but such components are not illustrated in this example for the sake of brevity. The client computer systems 350 each includes a browser program 358 executing in memory 357, such as to enable a user of such a client computer system to interact with a Web-based GUI provided by the configurable workflow service system 340, and also optionally stores information 355 about client-specific workflow components on the local storage 354, although in other embodiments one or both of these components may not be present on some or all client systems. Furthermore, a particular client computer system 350 may have more or less components than are illustrated.

An embodiment of a configurable workflow service system 340 is executing in memory 330 of computer system 300, such as to include software instructions that, when executed by the CPU 305, program or otherwise configure the computer system 300 to perform automated operations to provide some or all of the described techniques. While not illustrated in FIG. 3, the system 340 may include one or more modules, optionally corresponding to modules 120 and/or 130 of FIG. 1. In addition, the server computer system may further optionally execute one or more online storage services 335 and/or one or more online program execution services 337 in memory 330, such as to correspond to situations in which the configurable workflow service system 340 is integrated with or otherwise operates in conjunction with such services 335 and/or 337, although the system 340 may instead operate independently of any such other systems in some embodiments. In other embodiments, any such online storage services and/or online program execution services that are used by the configurable workflow service system 340 may be accessed over the network 390, such as with respect to optional systems 360 and/or 370.

In this example embodiment, the configurable workflow service system 340 includes functionality related to managing workflow-related functionality for supported client systems, and is further optionally configured to interact with client computer systems 350 and/or other systems and devices over the network 390 (e.g., via the Internet and/or the World Wide Web, via a private cellular network, etc.). The other systems 350, 360, 370 and/or 380 may also each be executing various software as part of interactions with the system 340. Various information related to the operation of the configurable workflow service system 340 (and optionally services 335 and/or 337) may be stored in storage 320 or instead remotely, such as information 322 about particular client systems and/or users, information 324 about one or more particular defined workflows for clients, and information 326 about any defined workflow components, such as in a manner similar to that of information 112-116 of FIG. 1 or as described elsewhere herein. Additional details regarding operations of the system 340 in particular embodiments are described in greater detail elsewhere.

It will be appreciated that systems 300, 350, 360, 370 and 380 are merely illustrative and are not intended to limit the scope of embodiments of the present disclosure. For example, system 340 may instead be executed by multiple interacting computing systems or devices, and computing system 300 may be connected to other devices that are not illustrated, including through one or more networks such as the Internet, via the World Wide Web ("Web"), or other electronic communications network (e.g., cellular based network, public switched telephone network). More generally, a computer system or computing system or computing node may comprise any combination of hardware that can interact and perform the described types of functionality, optionally when programmed or otherwise configured by particular corresponding software instructions, including without limitation desktop or other fixed-location computers, laptops and tablets and other mobile computers, database servers, network storage devices and other network devices, PDAs, smart phones and other cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated system 340 may in some embodiments be distributed in various modules.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computer systems via inter-computer communication. Thus, in some embodiments, some or all of the described techniques may be performed by hardware means that include one or more processors and/or memory and/or storage when configured by one or more software programs (e.g., by the system 340) and/or data structures (e.g., defined workflow information 324 and/or defined workflow component information 326), such as by execution of software instructions of the one or more software programs and/or by storage of such software instructions and/or data structures. Furthermore, in some embodiments, some or all of the systems and/or modules may be implemented or provided in other manners, such as by using means (e.g., specialized electronics) that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on non-transitory computer-readable storage media, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
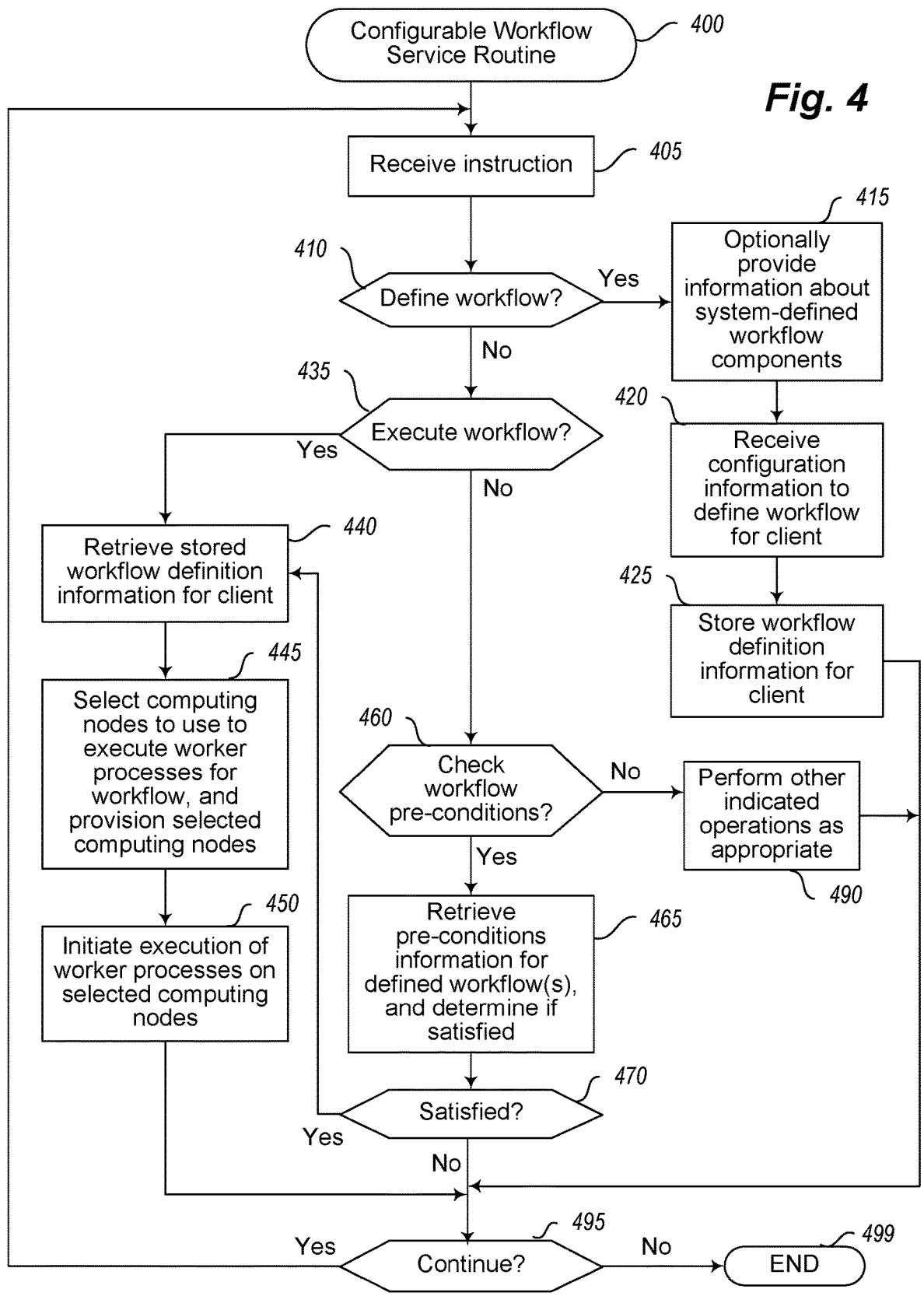
FIG. 4 illustrates an example embodiment of a flow diagram for a Configurable Workflow Service routine.

FIG. 4 is a flow diagram of an example embodiment of a Configurable Workflow Service routine 400. The routine may be provided by, for example, execution of the configurable workflow service 110 of FIG. 1 and/or the configurable workload service system 340 of FIG. 3, such as to manage the definition and implementation of workflows for various remote clients of the configurable workflow service. In this example embodiment, the routine may manage accessing information from and/or providing information to one or more data storage systems or data storage services, whether external to the configurable workflow service routine, or integrated with or otherwise affiliated with the configurable workflow service routine, although the described techniques may be used in other manners in other embodiments.

In the illustrated embodiment, the routine begins at block 405, where an instruction is received related to managing workflow-related functionality. The routine continues to block 410 to determine if the instruction received in block 405 is to define a new workflow on behalf of a client of the configurable workflow service. If so, the routine continues to blocks 415-425 to obtain and store information about a defined workflow for the client. As described in greater detail elsewhere, in some embodiments and situations, the configurable workflow service may provide a user interface via which a user representative of the client interactively specifies information for the new workflow being defined, while in other embodiments the information to use to define a new workflow may instead be received via one or more programmatic interactions from one or more executing programs on behalf of the client.

In the illustrated embodiment, the routine in block 415 optionally provides information to the client about options for defining the new workflow, including system-defined workflow components that are available to be selected and used by the client—such information may be provided, for example, via a GUI of the configurable workflow service by displaying corresponding information and functionality to the user. After block 415, the routine continues to block 420 to receive configuration information to define the workflow for the client. In some embodiments, such configuration information may be received via programmatic interactions with an API of the configurable workflow service, while in other embodiments and situations, the information received in block 420 may be provided via a user representative of the client via a user interface of the configurable workflow service. It will be appreciated that the definition of a workflow via a user interface of the configurable workflow service may involve multiple successive interactions by a user representative of the client, with the configurable workflow service optionally updating and providing additional or alternative information to the user via a user interface based on prior selections that have been made. Thus, the functionality of blocks 415 and 420 may include multiple iterative activities by the configurable workflow service in some embodiments and situations. After block 420, when the definition of the new workflow has been completed, the routine continues to block 425 to store workflow definition information for the client for later use, such as by using a database or other storage location internal to the configurable workflow service. In some embodiments, the client may further provide an instruction to initiate execution of the workflow at this time, such as may be handled with respect to blocks 435-450 of the routine 400.

Figure 5:
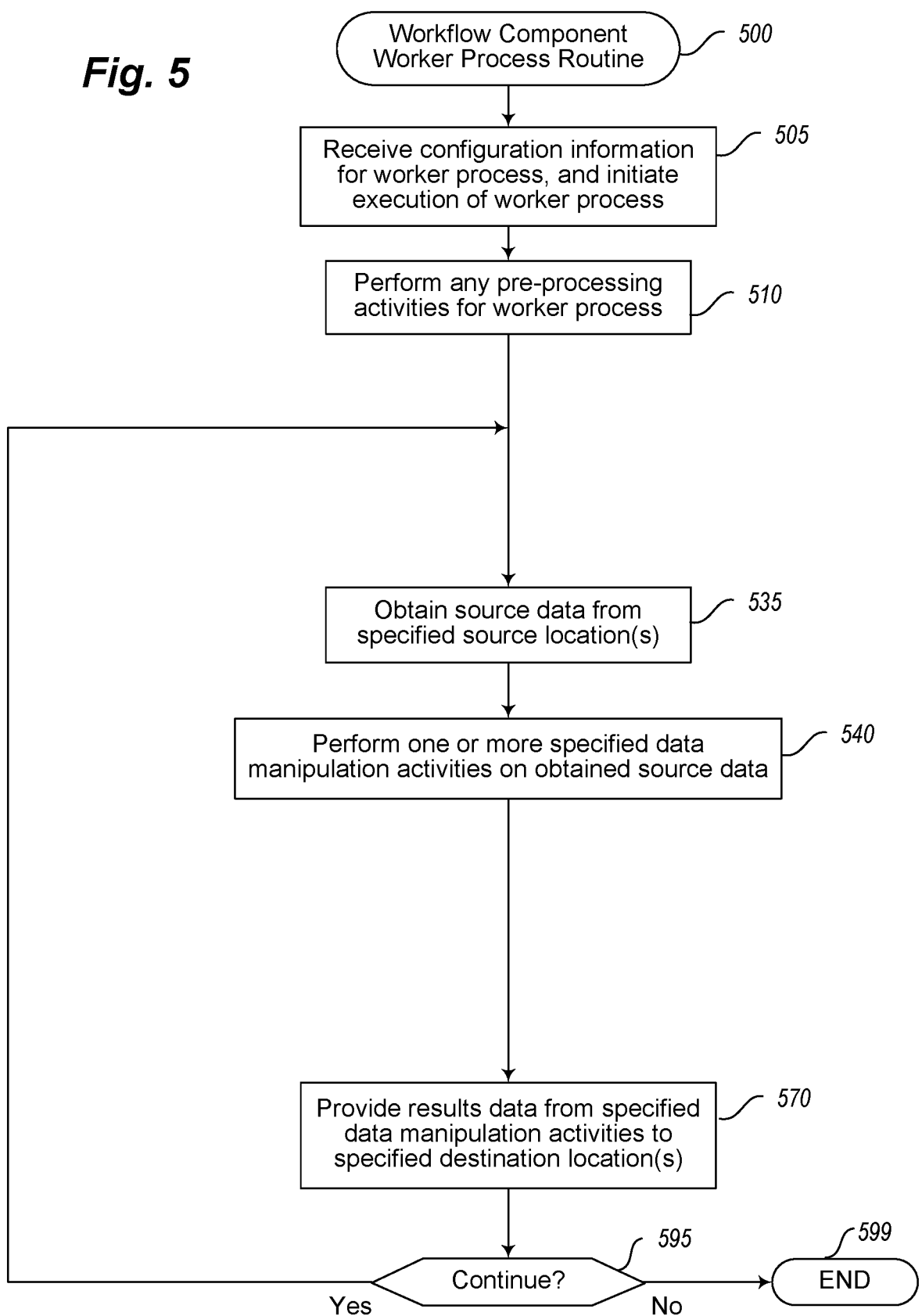
FIG. 5 illustrates an example embodiment of a flow diagram for a Workflow Component Worker Process routine.

If it is instead determined in block 410 that the instruction received in block 405 is not to define the new workflow, the routine continues instead to block 435 to determine if the received instruction is to execute an existing workflow, such as an instruction received from a client to initiate current execution (e.g., with respect to a newly defined workflow, as discussed with respect to blocks 415-425), an indication that a scheduled time that was previously specified for such execution has arrived, etc. If so, the routine continues to block 440 to retrieve stored workflow definition information for the client, such as from an internal database or other storage location associated with the configurable workflow service. After block 440, the routine continues to block 445 to select computing nodes to use to execute worker processes for the workflow, and to provision those selected computing nodes for those worker processes. As discussed in greater detail elsewhere, the computing nodes that are selected to be used may have various forms in various embodiments, including computing nodes provided by the configurable workflow service for use by the various clients of the configurable workflow service, computing nodes provided by one or more external (optionally affiliated) program execution services, computing nodes that are provided by or otherwise under the control of the client, etc. In addition, the provisioning of the selected computing nodes may include, for example, loading software to be executed for one or more particular worker processes on each selected computing node, optionally loading data to be used by such worker processes on each selected computing node, etc. After block 445, the routine continues to block 450 to initiate the execution of the worker processes for the workflow being executed on the selected computing nodes. FIG. 5 illustrates additional details of one example embodiment of provisioning and executing a worker process on a selected computing node.

If it is instead determined in block 435 that the instruction received in block 405 is not to execute a defined workflow, the routine continues instead to block 460 to determine if the instruction received is to check preconditions for one or more defined workflows, such as for workflows that are configured to execute when their preconditions are satisfied. If so, the routine continues to block 465 to retrieve information about preconditions for any such defined workflows, and to determine if those retrieved preconditions are currently satisfied. The routine then continues to block 470 to determine if sufficient preconditions have been satisfied for any defined workflows to initiate their implementation, and if so returns to block 440 to initiate execution of each such defined workflow. The instruction to check pre-conditions at a particular time may be initiated in various manners in various embodiments, such as on a periodic basis, in response to indications of events that have occurred (e.g., new arrival or availability of data), etc.

If it is instead determined at block 460 that the instruction received in block 405 is not to currently check workflow preconditions for any defined workflows, the routine continues instead to block 490 to perform one or more other indicated operations as appropriate. The operations performed with respect to block 490 may have various forms in various embodiments and at various times, including to modify or remove defined workflows for clients, stop or otherwise modify current or scheduled executions for defined workflows for clients, check for alarm conditions with respect to any defined workflows and take corresponding action as appropriate, etc.

After blocks 425, 450, or 490, or if it is instead determined in block 470 that no defined workflows have preconditions that are currently satisfied, the routine continues to block 495 to determine whether to continue, such as until an explicit indication to terminate is received. If it is determined to continue, the routine continues to block 405, and otherwise continues to block 499 and ends.

FIG. 5 is a flow diagram of an example embodiment of a Workflow Component Worker Process routine 500. The routine may be provided by, for example, execution of a configured worker process for a defined workflow on a provisioned computing node, such as with respect to the computing nodes 140 and workflow worker processes 142 of FIG. 1 and computing nodes 140 and worker processes 235b-280b of FIG. 2B, with respect to computing nodes provided by other external program execution services and corresponding worker processes executed by those computing nodes, and/or with respect to computing nodes provided by or otherwise controlled by the client and corresponding worker processes executed by those computing nodes.

In this example embodiment of the routine, the actions of the routine are illustrated with respect to a single worker process, although it will be appreciated that a particular computing node may execute multiple worker processes in particular embodiments and situations, and that a particular worker process may in some embodiments and situations be executed on multiple computing nodes or other computing systems (e.g., in a distributed manner, such as simultaneously and/or serially on those computing systems). In addition, it will be appreciated that particular workflow component worker processes may perform different operations (e.g., more or less than are illustrated) in accordance with particular configurations for their corresponding workflow components.

The illustrated embodiment of the routine begins at block 505, where configuration information is received for a worker process of a defined workload to be executed, and execution of the worker process is initiated. In some embodiments and situations, the configuration information and execution initiation are received based on one or more interactions with the routine 400 of an embodiment of the configurable workflow service, such as with respect to blocks 445 and 450 of FIG. 4. As discussed in greater detail elsewhere, each worker process may have various associated information, including to be of a defined type, to have defined software code to be executed to implement the worker process, to have one or more defined data sources from which the worker process will receive input, to have one or more defined data destinations to which data results produced by the worker process will be provided, to optionally have other data associated with the worker process (e.g., configuration information related to how the worker processes will perform one or more specified data manipulation operations), to optionally have one or more preconditions and/or post conditions, to optionally have one or more associated alarms, etc. Thus, while not illustrated with respect to the example embodiment of routine 500, in other embodiments, the routine may further receive additional information in block 505 or at other times, including configuration data to be used by the worker process.

After block 505 the routine continues to block 510, where it optionally performs any pre-processing activities for the worker process, such as to prepare the worker process to perform its specified data manipulation operations or other operations. After block 510, the routine continues to block 535, where it obtains source data to be used by the worker process from one or more specified source locations. For example, in some embodiments and situations, preconditions may be used that are based at least in part on determining availability of such source data. After block 525, the routine continues to block 540 to perform one or more specified data manipulation activities for the worker process on the obtained source data. As discussed in greater detail elsewhere, such specified data manipulation activities may have various forms in various embodiments and situations, including to move data from one location to another location, to modify or otherwise transform data in various manners, etc.

After block 540, the routine continues to block 570 to provide the results from the specified data manipulation activities of block 540 to one or more specified destination locations. As discussed in greater detail elsewhere, such activities in providing the results data may include storing some or all of the results data in a specified storage location, sending one or more electronic communications that include some or all of the specified results data, generating a particular report or other format that includes some or all of the results data for presentation, etc.

After block 570, the routine continues to block 595 to determine whether to continue, such as until an explicit indication to terminate is received. If it is determined to continue, the routine returns to block 520, and otherwise continues to block 599 and ends. In the illustrated embodiment, a given worker process may thus perform the activities of blocks 520-570 multiple times if so configured, such as to perform one or more specified data manipulation activities on different groups of source data at different times, including in situations in which the computing node(s) executing the worker process are operated for extended periods of time, such as for multiple implementations of the defined workflow. In other embodiments, the worker process may further at times receive additional configuration information that modifies future performance of the worker process and/or may perform other pre-processing activities at times, and thus in such situations the routine may return from block 595 to blocks 505 and/or 510 if appropriate.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different manners in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

Additional details are included below related to a particular example embodiment of a configurable workflow service, although it will be appreciated that the described techniques are not limited by such details.

In this example embodiment, configurable workflow service ("CWS") workflows (also referred to as "pipelines" in this example embodiment) are defined via a configuration language that enables description of nodes (also referred to as "objects" in this example embodiment) that form a pipeline. There are 5 general types of objects one can describe in an CWS pipeline in this example embodiment, as follows:

- Data Sources—An input to, or an output from a data manipulation workflow component (also referred to as an "activity" in this example embodiment).
- Activities—An operation to run, such as data processing transforms and data copies. Activities can be set to alarm on certain states and to retry multiple times on failure. Predefined activities include Copy, SQLTransform, HiveQLTransform, ElasticMapReduceTransform, and CommandLineTransform.
- Pre-Conditions and Post-Conditions—An action associated to a Data Source that evaluates to true when the Data Source is considered available and/or well formed. Pre conditions that complete successfully enable a following Activity that consumes a Data Source as an input to be run. Post conditions that complete successfully enable an Activity that creates a Data Source to be considered to be successfully completed.
- Schedules—An attribute of a Data Source that describes the periodicity of the data or of an Activity that defines the periodicity of when it runs, which can be at a granularity of one or more minutes, hourly, daily, weekly, monthly, etc.
- Alarms—Describes a message to be published to a notification service (e.g., Amazon's SNS, or Simple Notification Service), sent via an electronic communication (e.g., email), etc. Pipelines and individual Activities may have an Alarm defined for both failure and for success.

A Pipeline is composed of objects and objects consist of attributes. Attributes have the form tag: value.

Objects have a name: attribute and type: attribute. In addition to name and type, objects may have any number of other attributes depending on the type of the object. In the example below, the object 'Invoice Logs' describes a data object stored in an example online storage service SSS (referred to as <online-storage-service-SSS>) and has path: attribute in addition to name: and type:

name: Invoice Logs
type: <online-storage-service-SSS>DataNode
path: <online-storage-service-SSS>//my_data/xyz.cvs An attribute may optionally be repeated within an object. In the example below, input: is repeated and the values for each input: attribute are treated as an ordered list:

name: Invoice Processing
type: CommandRunnerTransform
input: Invoice Logs
input: Invoice Dimensions The value of an attribute may be one of:
an object reference
an expression
a string literal Here is a brief example showing each type of attribute value:
name: HourPeriod
type: Schedule
period: "1 hour"←--This is a string literal
Name: An Object
type: MyTransform
dimension: HourPeriod←-----This is an object reference
attrib: #{interval.end}←--This is an expression Consider an example of concatenating 5 minute logs into an hourly log. Here is a simple Pipeline that concatenates 5 minute logs into an hourly log in online-storage-service-SSS on a recurring basis. This Pipeline consists of:
an input Data Source—5 minute click logs in <online-storage-service-SSS>
a copy Activity
an output Data Source (e.g., a data destination node)—1 hour click logs in <online-storage-service-SSS>
2 Schedule objects
an Alarm object name: FiveMinPeriod
type: Schedule
period: "5 minutes"
name: HourPeriod
type: Schedule
period: "1 hour"
name: Five Minute Logs
type: <online-storage-service-SSS>DataNode
dimension: FiveMinPeriod
path: "<online-storage-service-SSS>://prod/Clicks/#{interval.end}.csv"
name: Concatenate
type: CopyTransform
dimension: HourPeriod
input: Five Minute Logs
output: Hourly Logs
onFail: CopyFailedAlarm
name: CopyFailedAlarm
type: "EmailAlarm"
to: <client-email-address>
subject: "Click 5 min->1 hour Failed!"
body:
  Error for interval #{node.interval.start} . . . #{node.interval.end}
name: Hourly Logs
type: <online-storage-service-SSS>DataNode
dimension: HourPeriod path: "<online-storage-service-SSS>://XXX-test/OutData/#{interval.end}.csv"

First, let's describe our 5 minute click logs in additional detail, which are the input to our Pipeline. The following 2 objects define 1) a Schedule ('FiveMinPeriod') and 2) a Data Source ('Five Minute Logs') that is associated with 'FiveMinPeriod':

name: FiveMinPeriod
type: Schedule
period: "5 minutes"
name: Five Minute Logs
type: <online-storage-service-SSS>DataNode
dimension: FiveMinPeriod
path: "<online-storage-service-SSS>://prod/Clicks/#{interval.end}.csv"

This has the effect of describing a series of <online-storage-service-SSS>files such as:
. . .
<online-storage-service-SSS>://prod/Clicks/2011-11-14:10:05:00.csv
<online-storage-service-SSS>://prod/Clicks/2011-11-14:10:10:00.csv
<online-storage-service-SSS>://prod/Clicks/2011-11-14:10:15:00.csv

```
<online-storage-service-SSS>://prod/Clicks/2011-11-14:10:
20:00.csv
<online-storage-service-SSS>://prod/Clicks/2011-11-14:10:
25:00.csv
. . .
```

Each such online-storage-service-SSS file can be thought of as an instance of 'Five Minute Logs'. Each one is distinct from the others based on the time period they represent, and the data that they include.

Further consider the object information shown below:
name: Five Minute Logs
type: <online-storage-service-SSS>DataNode
dimension: FiveMinPeriod
path: "<online-storage-service-SSS>://prod/Clicks/#{interval.end}.csv"

The type: attribute identifies this as an <online-storage-service-SSS>DataNode source object. The name: can be anything, but in this example embodiment may be unique for this Pipeline definition. Data Source objects such as <online-storage-service-SSS>DataNodes may also have a dimension attribute in this example embodiment, which describes different ways an object can be materialized into occurrences. One common example of dimension is time period, which can be expressed as minutes, hours, days, weeks, or months. Another example dimension is one based on geographic regions, such as to correspond to different locations of data source systems.

In addition, time periods may be specified by schedule objects in this example embodiment. In particular, we define a schedule object that specifies a 5 minute period as follows:
name: FiveMinPeriod
type: Schedule
period: "5 minutes"

Notice 'Five Minute Logs's dimension: attribute refers to the schedule object
'FiveMinPeriod'. Now let's looks at the path: attribute:
path: "<online-storage-service-SSS>://prod/Clicks/#{interval.end}.csv"

The sequence '#{ }' describes an expression. In this case the expression to be evaluated is interval.end. Because 'Five Minute Logs' has a schedule associated with it, it contains an attribute called 'interval', which itself has a 'start' and 'end' value. In this way, interval.start . . . interval.end describes a specific time interval of a schedule:

```
. . .
interval.start 2011-11-14:10:00:00    interval.end 2011-11-14:10:05:00
interval.start 2011-11-14:10:05:00    interval.end 2011-11-14:10:10:00
interval.start 2011-11-14:10:15:00    interval.end 2011-11-14:10:20:00
. . .
```

The path: attribute is evaluated as an <online-storage-service-SSS>file name using the end of each 5 minute interval per the schedule object in this case.

Next, let's describe an activity that reads an hour's worth of 5 minute clicks and concatenates them into an hourly output file. These 3 objects define 1) a Schedule ('HourPeriod'), 2) a CopyTransform ('Concatenate') that is associated with 'HourPeriod', and 3) an Alarm ('CopyFailedAlarm') that will be invoked the event of failure:
name: HourPeriod
type: Schedule
period: "1 hour"
name: Concatenate
type: CopyTransform
dimension: HourPeriod
input: Five Minute Logs
output: Hourly Logs
onFail: CopyFailedAlarm
name: CopyFailedAlarm
type: "EmailAlarm"
to: <client-email-address>
subject: "Click 5 min->1 hour Failed!"
body:
  Error for interval #{node.interval.start} . . . #{node.interval.end}

CWS schedules and runs 'Concatenate' when an hour's worth of input: ('Five Minute Logs') is available. When all 20 5-minute files for a given hour are ready, each will be copied into output 'Hourly Logs'. If the 'Concatenate' process encounters a failure condition, the Alarm object 'CopyFailedAlarm' will run and send an email.

In particular, 'Concatenate' is an object of type 'CopyTransform', which is a built-in Activity provided by CWS in this example embodiment. The CopyTransform takes an input Data Source and an output Data Source. Activities (CopyTransform is a type of Activity) may have a Schedule dimension associated with them, just like a Data Source. In this case, 'Concatenate' is associated with the Schedule object 'Hour Period', which describes an hourly time interval. This can be thought of as the following: "'Concatenate' processes 1 hour's worth of data".

The Schedule of the input: in this case ('Five Minute Logs') describes a 5 minute interval, while the schedule of 'Concatenate' is hourly. CWS infers that 20 5-minute input files map to the hourly interval of processing 'Concatenate' is configured for. An Alarm object such as 'CopyFailedAlarm' can be associated with any number of Activities. The body: attribute in this case contains the following expressions: Error for interval #{node.interval.start} . . . #{node.interval.end}. Alarms have a node: attribute that at runtime evaluates to the object the Alarm is reporting on. In this case, the 'node' would refer to the object 'Concatenate' if the alarm was fired due to a failure with 'Concatenate'.

Finally, here is our output Data Source:
name: Hourly Logs
type: <online-storage-service-SSS>DataNode
dimension: HourPeriod
path: "<online-storage-service-SSS>://prod/concat-clicks/#{interval.end}.csv"

This has the effect of describing a series of <online-storage-service-SSS>files such as:

```
. . .
<online-storage-service-SSS>//prod/concat-clicks/2011-11-14:00:0:00.csv
<online-storage-service-SSS>://prod/concat-clicks/2011-11-14:01:0:00.csv
<online-storage-service-SSS>://prod/concat-clicks/2011-11-14:02:0:00.csv
. . .
```

Each <online-storage-service-SSS>file may be thought of as an instance of 'Hourly Logs'. Each one is distinct from the others based on the time period they represent, and the data that they include.

Further consider the following:
name: Concatenate
type: CopyTransform
dimension: HourPeriod
input: Five Minute Logs
output: Hourly Logs
name: Hourly Logs
type: <online-storage-service-SSS>DataNode
dimension: HourPeriod path: "<online-storage-service-SSS>://prod/concat-clicks/#{interval.end}.csv"

Like the 'Five Minute Logs' Data Source described above, 'Hourly Logs' is associated with a Schedule, which in this case is an hourly Schedule. The path: attribute is evaluated as an <online-storage-service-SSS>file name using the end of each hourly interval per the schedule object in this case. The 'Concatenate' Activity specifies 'Hourly Logs' as the output Data Source. When CWS schedules and runs 'Concatenate', it also will give rise to an <online-storage-service-SSS>file corresponding to the ending time range of the hourly schedule period for the current run.

The value of an attribute can take the following forms:
an object reference
an expression
a string literal With respect to object references, an attribute can refer to another Pipeline object by name. This useful in forming certain types of expressions:
    name: object1
    type: sample
    name: object2
    type: sample
    attrib1: object1<------Reference to object1

With respect to expressions, an expression occurs within this construct: #{"expression" }. Expressions can be
a built in function:
    attrib: #{day(currentTime( ))}
a string value:
    attrib: #{"this is a string value"}
concatenation of string terms:
    attrib: #{"prefix-"+functionReturningString( )}
an integer or floating point value:
    attrib: #{func(3.14, 5)}
numeric expressions:
    attrib: #{func(3.14+5)}
a simple reference to another attribute
    name: object1
    type: sample
    attrib1: #{today( )}
    attrib2: #{attrib1}<------attrib2 will have the value of attrib1
a qualified reference to another attribute
    name: object1
    type: sample
    attrib1: #{today( )}
    attrib2: attrib1
    name: object2
    type: sample
    attrib3: object1<------An object reference, does not appear inside
the '#{ }' construct
    attrib4: #{attrib3.attrib2}<------This is a qualified attribute reference (value is object1.attrib2)

With respect to string literals, an attribute can have a string literal value, such as "this is a string literal". Also, a string literal can contain an expression, which is evaluated as a string:
    attrib1: "This contains an #{attrib2}"
    attrib2: "expression"
Notice that attrib1 above has an expression embedded via the expression construct: '#{ }'
String literals can also be multi-line. In this case, each line indented 2 spaces:
    attrib3:
      This is line one
      This is the second line
      And this is the last line As noted above, these details of these example embodiments are provided for the purpose of illustration, and are not intended to limit the scope of the described techniques with respect to other embodiments.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A non-transitory computer-readable medium having stored thereon instructions, which if performed by a processor, cause one or more computing systems to at least:
   receive information for a workflow to be provided for a customer of an online service, wherein the information includes an indication of one or more data sources to be used by the workflow;
   provision one or more computing nodes to be used by the workflow; and
   perform the workflow for the customer of the online service at least in part by using the provisioned computing nodes at least to retrieve input data from the one or more data sources and to use the input data to generate output data and to store the output data in one or more storage locations distinct from the one or more data sources.

2. The non-transitory computer-readable medium of claim 1 wherein the one or more data sources are external to the online service and include a network-accessible storage service that stores at least some of the input data to be obtained, and wherein retrieving of the input data includes performing, by the online service, one or more interactions over one or more computer networks with the network-accessible storage service to access the at least some input data stored by the network-accessible storage service.

3. The non-transitory computer-readable medium of claim 2 wherein the receiving of the information includes receiving, from a client of the network-accessible storage service, access information specific to the client for the network-accessible storage service, and wherein the performing of the one or more interactions includes using, by the online service, the access information as part of the accessing of the at least some input data stored by the network-accessible storage service.

4. The non-transitory computer-readable medium of claim 2 wherein the one or more data sources further include multiple separate network-accessible storage services that each stores a subset of the input data, wherein the workflow includes multiple data source workflow components that are each specific to one of the multiple network-accessible storage services, and wherein the retrieving of the input data further includes:
   performing, by the online service and using the multiple data source workflow components, at least one of the interactions over the one or more computer networks with each of the multiple network-accessible storage services to retrieve the subset of the input data stored by that network-accessible storage service; and combining, by the online service, the retrieved subsets of input data from two or more of the multiple network-accessible storage services.

5. The non-transitory computer-readable medium of claim 2 wherein the receiving of the information includes receiving the information from a customer of the online service, wherein the one or more storage locations include a second network-accessible storage service, and wherein storing of the output data includes performing, by the online service, one or more additional interactions over the one or more computer networks with the second network-accessible storage service to store at least some of the output data in a manner associated with the customer.

6. The non-transitory computer-readable medium of claim 5 wherein the one or more storage locations further include multiple separate network-accessible storage services that each stores a subset of the output data, wherein the workflow includes multiple data destination workflow components that are each specific to one of the multiple network-accessible storage services, and wherein the storing of the output data further includes performing, by the online service and using the multiple data source workflow components, at least one of the additional interactions over the one or more computer networks with each of the multiple network-accessible storage services to provide the subset of the output data to be stored by that network-accessible storage service.

7. The non-transitory computer-readable medium of claim 1 wherein the provisioning of the one or more computing nodes includes selecting the one or more computing nodes from a plurality of computing nodes provided by the online service for use in performing workflows for multiple customers of the online service, and configuring the one or more computing nodes to perform activities for the workflow including data manipulation operations that are based at least in part on the input data and are performed as part of generating the output data.

8. The non-transitory computer-readable medium of claim 7 wherein the data manipulation operations include modifying the input data in one or more defined manners to enable further manipulations of the modified input data by at least one of the provisioned computing nodes.

9. The non-transitory computer-readable medium of claim 1 wherein the input data is log data from one or more transaction servers and the one or more data sources include the transaction servers, and wherein generating the output data includes analyzing the input data to identify actions that occur in interactions with the one or more transaction servers.

10. The non-transitory computer-readable medium of claim 1 wherein the performing of the workflow occurs multiple times with multiple distinct groups of input data.

11. The non-transitory computer-readable medium of claim 10 wherein the multiple distinct groups of input data correspond to log data from one or more Web servers for multiple distinct periods of time, and wherein generating of the output data for each execution of the defined workflow includes analyzing the at least some input data to identify actions that occur for the one or more Web servers during one of the multiple periods of time.

12. The non-transitory computer-readable medium of claim 10 wherein the receiving of the information includes receiving configuration information from a customer of the online service to further specify that the input data is to be retrieved from the one or more data sources if one or more specified criteria are satisfied, wherein the stored instructions further cause the one or more computing systems to determine, by the online service and for each of the multiple times, that the one or more specified criteria are satisfied for that time, and wherein retrieving of the input data from the one or more data sources is performed for each of the multiple times based at least in part on the determining for that time.

13. A system, comprising:
one or more hardware processors; and
one or more memories with stored instructions that, when executed by at least one of the one or more hardware processors, cause the at least one hardware processor to provide functionality of an online service, including:
receiving configuration information for a defined workflow to be implemented for a customer of the online service, wherein the configuration information specifies one or more external data sources from which input data is to be obtained;
provisioning computing nodes provided by the online service to implement workflow components for the defined workflow; and
executing the defined workflow for the customer of the online service by using the provisioned computing nodes to perform activities of the implemented workflow components, including retrieving the input data from the one or more external data sources, using the obtained input data in one or more further activities to generate output data, and storing the output data in one or more specified storage locations distinct from the one or more data sources.

14. The system of claim 13 wherein the one or more specified storage locations include a network-accessible storage service, and wherein the storing of the output data includes performing, by the online service, one or more interactions over one or more computer networks with the network-accessible storage service to store at least some of the output data in a manner associated with the customer.

15. The system of claim 14 wherein the one or more external data sources include a second network-accessible storage service that stores at least some of the input data to be obtained, and wherein the obtaining of the input data includes performing, by the online service, one or more additional interactions over the one or more computer networks with the second network-accessible storage service to access the at least some input data stored by the second network-accessible storage service.

16. A computer-implemented method comprising:
receiving, by one or more computing systems implementing an online service, information for a defined workflow to be provided for a customer of the online service, wherein the information specifies one or more data sources external to the online service from which input data is to be accessed if one or more specified criteria are satisfied;
determining, by the one or more computing systems, that the one or more specified criteria are satisfied;
provisioning, by the one or more computing systems, one or more computing nodes provided by the online service to implement one or more workflow components for the defined workflow; and
executing, by the one or more computing systems, the defined workflow for the customer by using the provisioned computing nodes to perform activities of the implemented workflow components, including retrieving the input data from the one or more data sources based at least in part on the determining that the one or more specified criteria are satisfied, using the retrieved input data in one or more further activities to generate output data, and storing the output data in one or more specified storage locations distinct from the one or more data sources.

17. The computer-implemented method of claim 16 wherein the provisioning of the one or more computing nodes includes associating at least one of the specified criteria as a pre-condition of at least one of the implemented workflow components.

18. The computer-implemented method of claim 16 wherein the determining that the one or more specified criteria are satisfied occurs at a first time, and wherein the method further comprises:
   determining, by the one or more computing systems at a second time, that the one or more criteria are not satisfied at the second time; and
   generating, by the one or more computing systems in response to the determining at the second time, an alarm notification for the customer.

19. The computer-implemented method of claim 16 wherein the one or more specified criteria include at least one of an amount of time since a prior use of the defined workflow or a specified time, and wherein the determining that the one or more criteria are satisfied includes identifying an occurrence of the at least one of the amount of time since the prior use or the specified time.

20. The computer-implemented method of claim 16 wherein the one or more specified criteria include the input data being available, and wherein the determining that the one or more criteria are satisfied includes interacting, by the one or more computing systems, with the one or more data sources to identify that the input data is available.

* * * * *